US011568524B2

(12) United States Patent
Helminger et al.

(10) Patent No.: US 11,568,524 B2
(45) Date of Patent: Jan. 31, 2023

(54) TUNABLE MODELS FOR CHANGING FACES IN IMAGES

(71) Applicants: DISNEY ENTERPRISES, INC., Burbank, CA (US); ETH Zürich (Eidgenössische Technische Hochschule Zürich), Zürich (CH)

(72) Inventors: Leonard Markus Helminger, Zurich (CH); Jacek Krzysztof Naruniec, Zurich (CH); Romann Matthew Weber, Zurich (CH); Christopher Richard Schroers, Zurich (CH)

(73) Assignees: DISNEY ENTERPRISES, INC., Burbank, CA (US); ETH ZÜRICH, (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 344 days.

(21) Appl. No.: 16/850,898

(22) Filed: Apr. 16, 2020

(65) Prior Publication Data
US 2021/0327038 A1 Oct. 21, 2021

(51) Int. Cl.
*G06V 40/16* (2022.01)
*G06T 5/20* (2006.01)
*G06T 9/00* (2006.01)

(52) U.S. Cl.
CPC .................. *G06T 5/20* (2013.01); *G06T 9/00* (2013.01); *G06V 40/168* (2022.01); *G06T 2207/20081* (2013.01)

(58) Field of Classification Search
CPC ... G06T 5/20; G06T 9/00; G06T 2207/20081; G06T 9/002; G06T 11/60; G06V 40/168; G06V 10/32; G06V 10/454; G06V 10/82; G06V 40/169
See application file for complete search history.

(56) References Cited

U.S. PATENT DOCUMENTS

2019/0197670 A1* 6/2019 Ferrer ................... G06K 9/6272
2021/0248727 A1* 8/2021 Fisher .................... G06T 11/60

OTHER PUBLICATIONS

Alexander et al., "Creating a Photoreal Digital Actor: The Digital Emily Project", In 2009 Conference for Visual Media Production, DOI 10.1109/CVMP.2009.23, 2009, pp. 176-187.

(Continued)

*Primary Examiner* — Phuoc Tran
(74) *Attorney, Agent, or Firm* — Artegis Law Group, LLP

(57) ABSTRACT

Techniques are disclosed for changing the identities of faces in images. In embodiments, a tunable model for changing facial identities in images includes an encoder, a decoder, and dense layers that generate either adaptive instance normalization (AdaIN) coefficients that control the operation of convolution layers in the decoder or the values of weights within such convolution layers, allowing the model to change the identity of a face in an image based on a user selection. A separate set of dense layers may be trained to generate AdaIN coefficients for each of a number of facial identities, and the AdaIN coefficients output by different sets of dense layers can be combined to interpolate between facial identities. Alternatively, a single set of dense layers may be trained to take as input an identity vector and output AdaIN coefficients or values of weighs within convolution layers of the decoder.

20 Claims, 9 Drawing Sheets

(56) References Cited

OTHER PUBLICATIONS

Blanz et al.,"Exchanging Faces in Images", Computer Graphics Forum vol. 23 No. 3, DOI https://doi.org/10.1111/j.1467-8659.2004.00799.x, 2004, pp. 669-676.
Blanz et al.,"A morphable model for the synthesis of 3D faces", In Siggraph, vol. 99., 1999, pp. 187-194.
Burt et al.,"A Multiresolution Spline With Application to Image Mosaics", ACM Transactions on Graphics, vol. 2, No. 4, Oct. 1983, pp. 217-236.
Dale et al.,"Video Face Replacement", In ACM Transactions on Graphics (TOG), vol. 30. ACM, 130, 2011, 10 pages.
Dong et al.,"Unsupervised Image-to-Image Translation with Generative Adversarial Networks", URL: arxiv.org/abs/1701.02676, Jan. 10, 2017, 05 pages.
Geng et al.,"Warpguided GANs for single-photo facial animation", ACM Transactions on Graphics 37, DOI https://doi.org/10.1145/3272127.3275043, 2018, 12 pages.
Goodfellow et al.,"Generative Adversarial Nets" In Advances in neural information processing systems, URL: https://arxiv.org/pdf/1406.2661.pdf, Jun. 10, 2014, pp. 2672-2680.
He et al.,"A powerful generative model using randomweights for the deep image representation", In Advances in Neural Information, Processing Systems, URL:https://arxiv.org/pdf/1606.04801.pdf, Jun. 16, 2016, pp. 631-639.
Helminger et al., "Disentangled Dynamic Representations from Unordered Data", 1st Symposium on Advances in Approximate Bayesian Inference, URL: https://arxiv.org/pdf/1808.02929.pdf, Dec. 10, 2018, 07 pages.
Isola et al.,"Image-to-Image Translation with Conditional Adversarial Networks", In Proceedings of the IEEE conference on computer vision and pattern recognition, 2017, pp. 1125-1134.
Karras et al.,"Progressive Growing of GANs for Improved Quality, Stability, and Variation" In International Conference on Learning Representations, URL: https://arxiv.org/pdf/1710.10196.pdf,Feb. 26, 2018, 26 pages.
Karras et al.,"A Style-Based Generator Architecture for Generative Adversarial Networks", URL: https://arXiv preprint arXiv:1812.04948, Mar. 29, 2018, 12 pages.
Kim et al.,"Deep Video Portraits", ACM Trans. Graph., vol. 37, No. 4, Article 163, DOI https://doi.org/10.1145/3197517.3201283, Aug. 2018, 14 pages.
Kingma et al.,"Adam: A Method for Stochastic Optimization", In 3rd International Conference on Learning Representations, URL: http://arxiv.org/abs/1412.6980, May 7-9, 2015, 15 pages.
Korshunova et al., "Fast Face-swap Using Convolutional Neural Networks", IEEE International Conference on Computer Vision (ICCV), URL: https://arxiv.org/pdf/1611.09577.pdf, 2017, pp. 3697-3705.
Kowalski et al., "Deep Alignment Network: A Convolutional Neural Network for Robust Face Alignment", IEEE Conference on Computer Vision and Pattern Recognition Workshops, 2017, pp. 88-97.
Lin et al.,"Face Swapping under Large Pose Variations: A 3D Model Based Approach" Proceedings—IEEE International Conference on Multimedia and Expo, 2012, pp. 333-338.
Liu et al., "Unsupervised Image-to-Image Translation Networks", 31st Conference on Neural Information Processing Systems, URL: http://papers.nips.cc/paper/6672-unsupervised-image-to-image-translation-networks.pdf, 2017, 09 pages.
Locatello et al.,"Challenging common assumptions in the unsupervised learning of disentangled representations",URL: arXiv preprint arXiv:1811.12359, 2018, 37 pages.
Natsume et al.,"FSNet: An Identity-Aware Generative Model for Image-based Face Swapping", n Proc. of Asian Conference on Computer Vision (ACCV). Springer, URL: https://arxiv.org/pdf/1811.12666 pdf, 2018, 20 pages.
Natsume et al.,"RSGAN: face swapping and editing using face and hair representation in latent spaces", URL: https://doi.org/10.1145/3230744.3230818, 2018, 07 pages.
Mirkin et al.,"On Face Segmentation, Face Swapping, and Face Perception", 13th IEEE International Conference on Automatic Face & Gesture Recognition, DOI 10.1109/FG.2018.00024, 2018, pp. 98-105.
Perez et al.,"Poisson image editing", ACM Trans. Graph. 22, DOI https://doi.org/10.1145/882262.882269, 2003, pp. 313-318.
Thies et al.,"Face2Face: Real-time Face Capture and Reenactment of RGB Videos", In Proc. Computer Vision and Pattern Recognition (CVPR), URL: https://arxiv.org/pdf/2007.14808.pdf, 2016, 12 pages.
Tran et al.,"Nonlinear 3D Face Morphable Model", In Proceedings of the IEEE Conference on Computer Vision and Pattern Recognition, 2018, pp. 7346-7355.
Wang et al.,"Video-to-Video Synthesis" In Advances in Neural Infomnation Processing Systems (NeurIPS), URL: https://arxiv.org/pdf/1808.06601.pdf, 2018, 14 pages.
Wang et al.,"Image Quality Assessment: From Error Visibility to Structural Similarity", IEEE transactions on image processing vol. 13, No. 4, 2004, pp. 600-612.
Wang et al., "Multiscale structural similarity for image quality assessment", Proceedings of the 37th IEEE Asilomar Conference on Signals, Nov. 9-12, 2003, 05 pages.
Yan et al.,"Video Face Swap Based on Autoencoder Generation Network", In International Conference on Audio, Language and Image Processing (ICALIP). IEEE, 2018, pp. 103-108.
Zhao et al.,"Joint face alignment and segmentation via deep multi-task learning", Multimedia Tools and Applications, DOI doi.org/10.1007/s11042-018-5609-1, Jan. 12, 2018, 18 pages.
Zhu et al.,"Unpaired Image-to-Image Translation using Cycle-Consistent Adversarial Networks", In Proceedings of the IEEE international conference on computer vision Foundation, 2017, pp. 2223-2232.
Zollhöfer et al.,"State of the art on monocular 3D face reconstruction, tracking, and applications", Graphics Forum, vol. 37, No. 2 Wiley Online Library, 2018, 28 pages.
Jacek et al., "Comb Networks for High-Resolution, Multi-Subject Face Swapping", ACM Transactions on Graphics, vol. 1, No. 1, Article Publication date: May 2019, 27 pages.

* cited by examiner

TUNABLE MODELS FOR CHANGING FACES IN IMAGES

BACKGROUND

Technical Field

Embodiments of the present disclosure relate generally to computer science and computer graphics and, more specifically, to tunable models for changing faces in images.

Description of the Related Art

Oftentimes, the facial identity of an individual needs to be changed in the frames of a video or in a standalone image while maintaining a performance of the individual. As used herein, a facial identity refers to an appearance of a face that is considered distinct from other facial appearances due to differences in personal identity, age, lighting conditions, or the like. Two facial identities may be of different individuals or the same individual under different conditions, such as the same individual at different ages or under different lighting conditions. As used herein, the performance of an individual, which is also sometimes referred to as the dynamic "behavior" of the individual, includes the expressions and poses with which the individual appears in the frames of a video or a standalone image.

One example scenario that requires a facial identity to be changed while maintaining the performance of an individual is when the individual needs to be portrayed at a younger age in a particular scene within a film. As another example, an individual may be unavailable for a given film production, and the face of that individual may need to be inserted into a particular scene to replace the face of another individual who was available to perform in the scene.

In some cases, multiple different facial identities, such as the facial identities of two individuals or of an individual and a computer-generated (CG) character, need to be blended together. For example, a film maker may want to blend a series of CG images of a character face with a matching series of images of an individual to produce a portion of a particular scene. This type of blending can be used to make the CG images of the character face appear more realistic while preserving the overall sharpness of the CG images.

Currently, there are few effective techniques for changing facial identities in high-resolution (e.g., megapixel) images or frames of a video. Some existing techniques utilize neural network models or geometry-based morphable models. However, as a general matter, such techniques can only be applied to low-resolution images or video frames. Further, existing neural network models need to be re-trained for each change between two facial identities. Such training is typically supervised and requires a large amount of training data.

As the foregoing illustrates, what is needed in the art are more effective techniques for changing or modifying faces that appear within images or frames of a video.

SUMMARY

One embodiment of the present disclosure sets forth a computer-implemented method for changing a face within an image. The method includes encoding an input image that includes a face to generate a latent representation of the input image. The method further includes decoding the latent representation based on one or more parameters that are determined via at least one dense layer of a machine learning model to generate an output image.

Other embodiments of the present disclosure include, without limitation, a computer-readable medium including instructions for performing one or more aspects of the disclosed techniques as well as a computing device for performing one or more aspects of the disclosed techniques.

At least one technical advantage of the disclosed techniques relative to the prior art is that the disclosed techniques can be effectively utilized to change or modify facial identities in high-resolution (e.g., megapixel) images or frames of a video. The disclosed techniques also enable multiple facial identities to be interpolated to produce novel combinations of facial identities, without requiring separate training of a machine learning model for each desired combination of facial identities. Further, using the disclosed techniques, models can be learned without requiring labeled data, which permits the disclosed techniques to be applied to a broader class of images and videos relative to prior art techniques. These technical advantages represent one or more technological improvements over prior art approaches.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
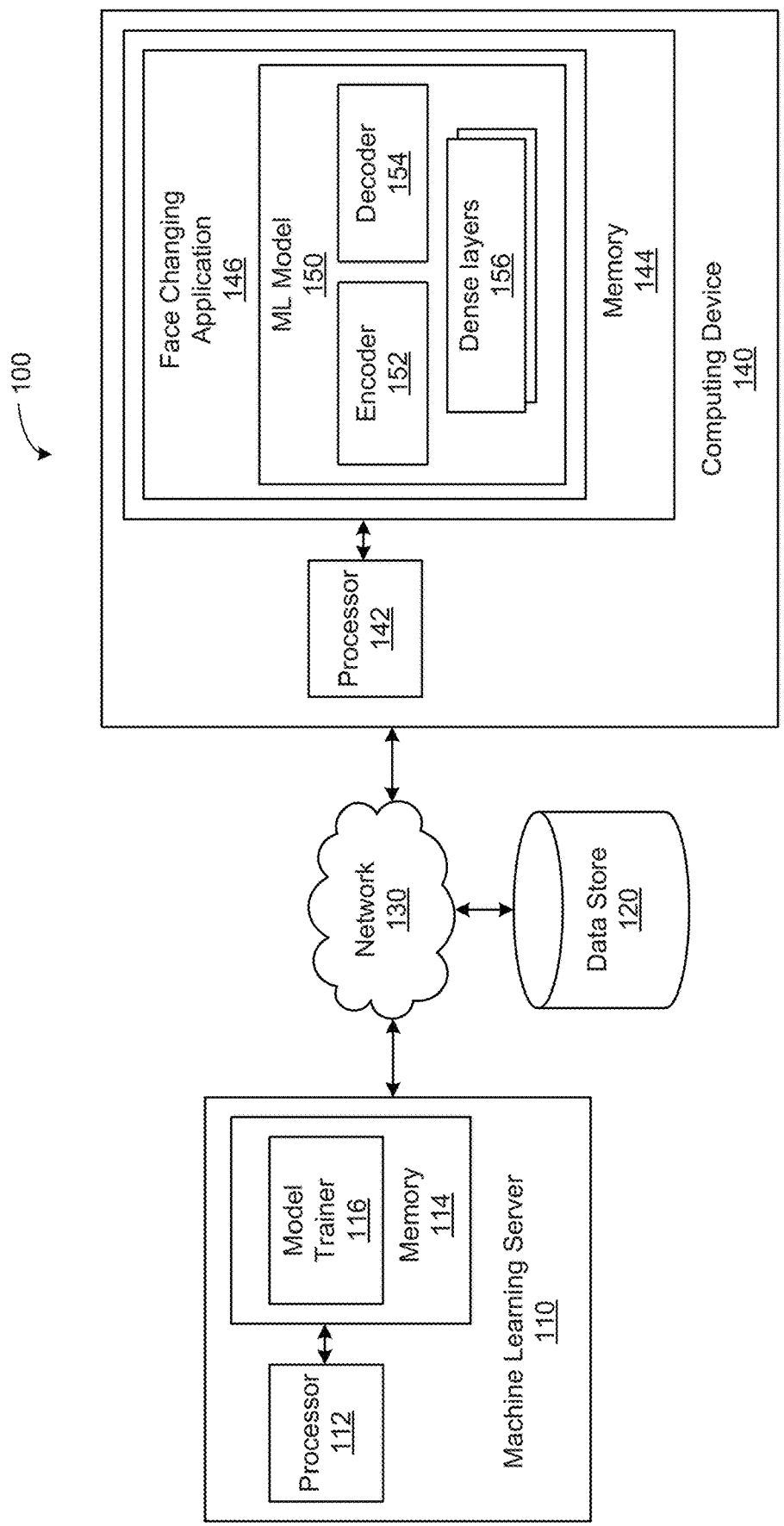
FIG. 1 illustrates a system configured to implement one or more aspects of the various embodiments.

FIG. 1 illustrates a system 100 configured to implement one or more aspects of the various embodiments. As shown, the system 100 includes a machine learning server 110, a data store 120, and a computing device 140 in communication over a network 130, which may be a wide area network (WAN) such as the Internet, a local area network (LAN), or any other suitable network.

As shown, a model trainer 116 executes on a processor 112 of the machine learning server 110 and is stored in a system memory 114 of the machine learning server 110. The processor 112 receives user input from input devices, such as a keyboard or a mouse. In operation, the processor 112 is the master processor of the machine learning server 110, controlling and coordinating operations of other system components. In particular, the processor 112 may issue commands that control the operation of a graphics processing unit (GPU) that incorporates circuitry optimized for graphics and video processing, including, for example, video output circuitry. The GPU may deliver pixels to a display device that may be any conventional cathode ray tube, liquid crystal display, light-emitting diode display, or the like.

The system memory 114 of the machine learning server 110 stores content, such as software applications and data, for use by the processor 112 and the GPU. The system memory 114 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 114. The storage may include any number and type of external memories that are accessible to the processor 112 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of GPUs, the number of system memories 114, and the number of applications included in the system memory 114 may be modified as desired. Further, the connection topology between the various units in FIG. 1 may be modified as desired. In some embodiments, any combination of the processor 112, the system memory 114, and a GPU may be replaced with any type of virtual computing system, distributed computing system, or cloud computing environment, such as a public, private, or a hybrid cloud.

The model trainer 116 is configured to train machine learning models, including a machine learning (ML) model 150 that can be used to change the identities of faces in images. Example architectures of the ML model 150, as well as techniques for training the same, are discussed in greater detail below.

As shown, the ML model 150 includes an encoder 152, a decoder 154, and multiple dense layers 156. The encoder 152 and the decoder 154 may be any technically feasible type of encoder and decoder, respectively. In some embodiments, the encoder 152 may be an encoder of an autoencoder, and the decoder 154 may be a decoder of the autoencoder. Operation(s) performed by the encoder 152 to encode an image into a latent representation are also referred to herein as "encoding operation(s)." Operation(s) performed to generate an output image from a latent representation using the decoder 154 are also referred to herein as "decoding operation(s)."

As discussed in greater detail below, the encoder 152 takes as input a two-dimensional (2D) image that includes a face and has been normalized. For example, the image could be a high-definition (HD) resolution image, such as a one megapixel image, including a face that has been normalized. As used herein, normalization refers to an alignment procedure that fits landmarks on a face appearing in an image to match landmarks of a generic face with a neutral expression. As a result, facial features such as the eyes, nose, etc. are at similar locations within normalized images that are input into the encoder 152, which can improve training of the ML model 150. In embodiments, an image can be normalized in any technically-feasible manner, including using face alignment techniques to compute an affine transformation that rotates, scales, translates, etc. the image, and/or cropping the image. An affine transformation is a linear mapping that preserves points, straight lines, and planes. For example, in some embodiments, normalizing an image includes detecting a largest face in the image and determining the locations of facial landmarks using a modified deep alignment network (DAN). In such cases, the image is then rotated and scaled so that the eyes of the largest face lie on a predefined horizontal line and have a predefined ocular distance. The image can then be cropped and resized to, e.g., 1024×1024 pixels.

Given a normalized image that includes a face, the encoder 152 outputs an encoded representation of the normalized image, which is also referred to herein as a "latent representation" of the normalized image. The latent representation is a most compressed version of the normalized image generated by the encoder 152, and the encoder 152 learns to be able to generate such a latent representation during training. The decoder 154 then takes as input the latent representation output by the encoder 152 and outputs a 2D image including a face. The image that is output by the decoder 154 may include the same facial identity that appears in the image input into the encoder 152, i.e., be a reconstruction in which the facial identity going into the encoder 152 matches the facial identity assignment of the decoder 154, or the output image may include a different facial identity, i.e., be a face swap in which the facial identity going into the encoder 154 differs from the facial identity assignment of the decoder 154. Reconstructions are necessary for self-supervised training, as in order to map expressions from one facial identity to another, it is also necessary to map the expression associated with a facial identity to itself. Further, the reconstruction of each facial identity is essentially a starting point for interpolations between facial identities, as a reconstruction is 100% of one facial identity and 0% of other facial identities.

Even though the decoder 154 can change the facial identity appearing in an image, the performance of the face in the image, including the facial expression and pose, are not changed by the decoder 154. For example, given an input image that includes an individual who is smiling and rotated in a particular direction, the decoder 154 could generate an output image in which a different individual is smiling and rotated in the same direction.

The facial identity in an image output by the decoder 154 can be selected by varying parameters that control layers within the decoder 154 and/or change the values of weights within the layers. Varying such parameters to change the facial identities in images output by the decoder 154 is also referred to herein as "tuning" the ML model 150. As shown, the ML model 150 includes dense layers 156 whose outputs can be directly used as the parameters, or used to generate the parameters, for tuning the ML model 150. Dense layers are sometimes also referred to as "fully-connected" layers.

In some embodiments, the dense layers 156 include different sets of dense layers for each facial identity that is learned during training. In such a case, adaptive instance normalization (AdaIN) coefficients output by the dense layers for a given facial identity can be used to control convolution layers within the decoder 154 so that the decoder 154 generates images including the given facial identity, as discussed in greater detail below in conjunction with FIG. 2. AdaIN coefficients are coefficients that can be used to perform multiplications and/or additions on activations of convolution layers, which is similar to performing an affine transformation and can cause the decoder 154 to generate images including different facial identities. Doing so essentially creates multiple "virtual" decoders, one for each of the different facial identities used to train the ML model 150. In other embodiments, the dense layers 156 include a single set of dense layers for multiple facial identities that are learned during training, and such dense layers may output either AdaIN coefficients that control convolution layers within the decoder 154 or weight values for the convolution layers, as discussed in greater detail below in conjunction with FIG. 3. Once again, changing the AdaIN coefficients used to control convolution layers within the decoder 154 or the weight values of the convolution layers can cause the decoder 154 to generate images including different facial identities. Although described herein primarily with respect to set(s) of dense layers, in some embodiments, a single dense layer may be used in lieu of a set of dense layers.

Training data and/or trained machine learning models, including the ML model 150, may be stored in the data store 120 and deployed in any suitable application, such as a face changing application 146. In some embodiments, the training data includes videos in which multiple facial identities appear under similar environmental and lighting conditions. For example, the environmental conditions may include the same setup, with the same background behind individuals who are recorded in the videos. In addition, frames in which faces are partially covered, or blurred due to motion, may be removed. In some embodiments, the ML model 150 can be trained using progressive training techniques that minimize reconstruction loss, as described in greater detail below in conjunction with FIGS. 5-6. Notably, such training is self-supervised, in contrast to the supervised training used to train conventional neural network models, and the self-supervised training can also require less training data. In some embodiments, the data store 120 may include any storage device or devices, such as fixed disc drive(s), flash drive(s), optical storage, network attached storage (NAS), and/or a storage area-network (SAN). Although shown as accessible over the network 130, in some embodiments the machine learning server 110 may include the data store 120.

Illustratively, the face changing application 146 is stored in a memory 144, and executes on a processor 142, of the computing device 140. Components of the computing device 140, including the memory 144 and the processor 142, may be similar to corresponding components of the machine learning server 110. As shown, the face changing application 146 includes the ML model 150. More generally, the ML model 150 may be deployed to any suitable applications. For example, the face changing application 146 could be a face-swapping application that changes the facial identities appearing in standalone images or the frames of a video using the ML model 150. As another example, the face changing application 146 could be an application that blends a computer-generated (CG) performance of a character with a matching performance by an individual using the ML model 150.

The number of machine learning servers and computing devices may be modified as desired. Further, the functionality included in any of the applications may be divided across any number of applications or other software that are stored and execute via any number of devices that are located in any number of physical locations.

Changing Faces in Images Using Tunable Models

Figure 2:
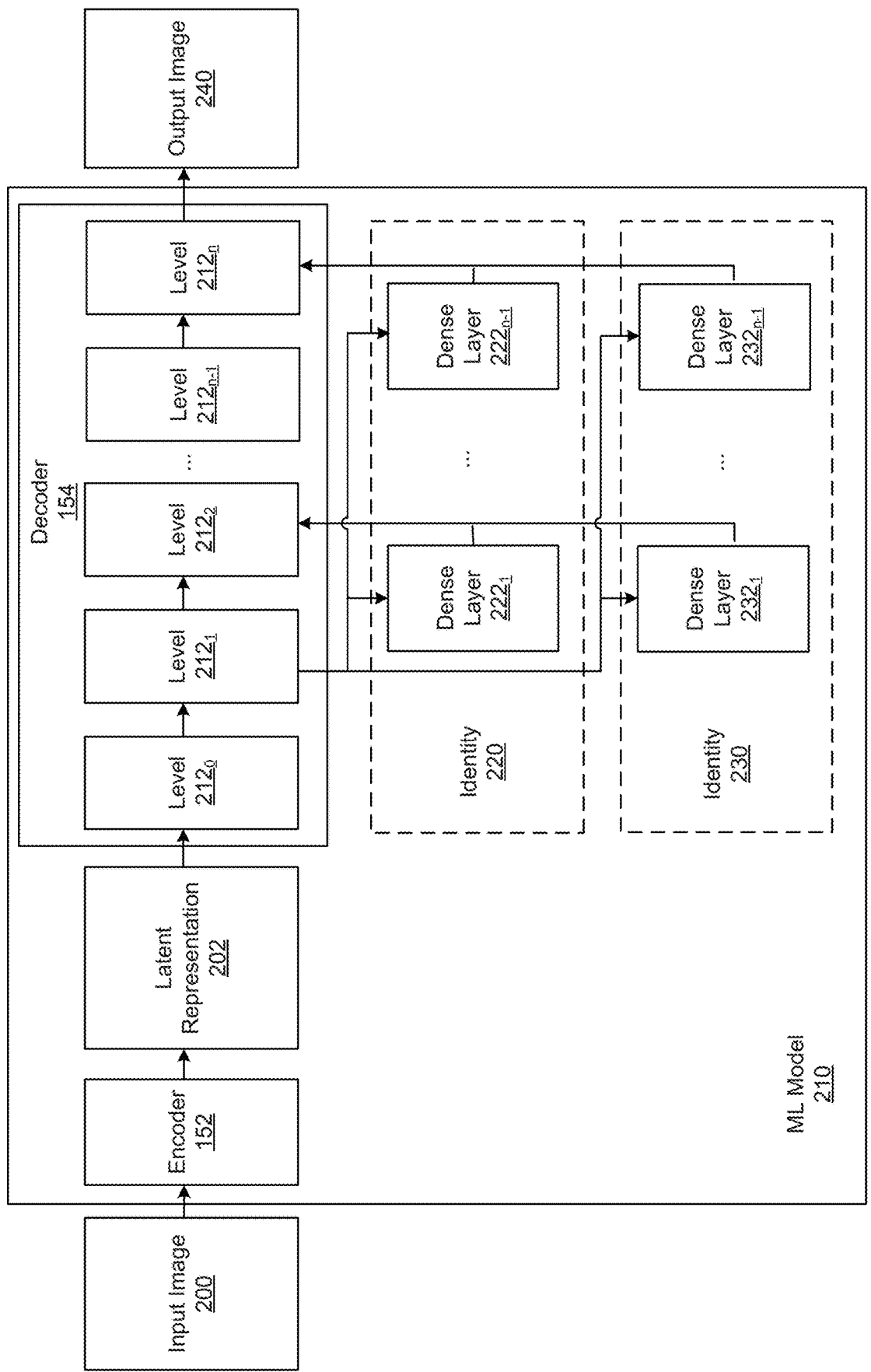
FIG. 2 is a more detailed illustration of the machine learning (ML) model of FIG. 1, according to various embodiments.

FIG. 2 is a more detailed illustration of the ML model 150 of FIG. 1, according to various embodiments. As shown, a ML model 210, which corresponds to the ML model 150, includes the encoder 152, the decoder 154, and sets of dense layers 222 and 232 that are associated with different facial identities 220 and 230, respectively. The dense layers 222 and 232 are referred to herein individually as a dense layer 222 and 232 and collectively as dense layers 222 and 232, respectively. Although dense layers 222 and 232 associated with two facial identities 220 and 230 are shown for illustrative purposes, the ML model 210 may generally include sets of dense layers associated with any number facial identities. Having sets of dense layers associated with different facial identities, which are learned during training of the ML model 210, permits the ML model 210 to generate images that include those facial identities, as well as combinations thereof, which are also referred to herein as "interpolations" of the facial identities.

In some embodiments, the face changing application 146 inputs an image 200 including a face into the ML model 210. As described, the image 200 can be, e.g., a normalized image in which landmarks of a face appearing in the image 200 have been aligned to match landmarks of a generic face with a neutral expression and the image has been cropped to a predefined size. Although a single image 200 is shown for illustrative purposes, multiple images, such as the frames of a video, may also be processed (sequentially) using the ML model 210. As shown, the encoder 152 processes the input image 200 to generate a latent representation 202 of the image 200. Thereafter, the latent representation 202 is input into the decoder 154, which generates an output image 240.

As shown, the decoder 154 includes multiple layers in levels $212_0$ to $212_n$, which are referred to herein individually as a level 212 and collectively as levels 212. In some embodiments, each of the levels corresponds to a different resolution and includes a convolution layer (or multiple convolution layers) and an upscaling layer. The convolution layer uses a filter, which is also sometimes referred to as a kernel, to generate a feature map from input data. The upscaling layer duplicates pixels to increase the resolution of an image. For example, the zeroth level $212_0$ of the decoder 154 may take as input a 2×2 pixel image and output a 4×4 pixel image, the first level $212_1$ of the decoder 154 may take as input the 4×4 pixel image output by the zeroth level $212_0$ and output an 8×8 pixel image, etc. Any technically feasible convolution and upscaling techniques may be employed in embodiments, including well-known techniques.

To change the identity of a face appearing in the input image 200 to one of the facial identities 220 or 230, a user can select to use AdaIN coefficients output by one of the sets of dense layers 222 or 232, respectively, to control convolution layers in levels $212_2$ to $212_n$ of the decoder 154. As described, AdaIN coefficients are coefficients that can be used to perform multiplications and/or additions on activations of convolution layers, which is similar to performing an affine transformation and can cause the decoder 154 to generate images including different facial identities. Alternatively, the user can select to use a combination of AdaIN coefficients output by the sets of dense layers 222 and 232 to control the convolution layers in the levels $212_2$ to $212_n$, in order to produce a facial identity that is an interpolation between the facial identities 220 and 230. Such interpolation is enabled by the fact that only one decoder 154 is used to generate the output image 240, as opposed to multiple decoders for different facial identities. Further, a single encoder-decoder architecture has a smaller parameter and memory footprint relative to an architecture that uses multiple decoders, and a single encoder-decoder architecture also permits relatively efficient training.

For example, a user could select to use 80 percent of the facial identity 220 and 20 percent of the facial identity 230, in which case the face changing application 146 may use a weighted average of AdaIN coefficients output by the dense layers 222, which would be multiplied by 0.8, and AdaIN coefficients output by the dense layers 232, which would be multiplied by 0.2, to control the convolution layers in levels $212_1$ to $212_n$ of the decoder 154. More generally, any convex combination of AdaIN coefficients that are output by different sets of dense layers (e.g., the dense layers 222 and 232) may be used to provide a convex mixture within the decoder 154. A convex combination is a linear combination in which coefficients of the combination are non-negative and sum to 1. It should be understood that such a mixture combines facial identities within a latent space and causes the decoder 154 to output an image that includes the combination of facial identities, rather than requiring output images that include different facial identities to be combined. Further, each of the facial identities 220 and 230 can either be a human facial identity or a computer-generated (CG) facial identity, so the combination of AdaIN coefficients output by the dense layers 222 and 232 can result in an interpolation between human facial identities and/or CG facial identities.

As shown, the latent representation 202 is first processed by the convolution and upscaling layers within the zeroth $212_0$ and first $212_1$ levels of the decoder 154. An output of the first level $212_1$ is then input into the dense layer $222_1$ and/or the dense layer $232_1$ to determine AdaIN coefficients that are used to control the convolution layers within levels $212_2$ to $212_n$ of the decoder. The dense layers 222 and 232 are essentially parallel pipelines that can be used to change the facial identities in images while the encoder-decoder track of the ML model 210 handles facial performances in the images. As a result, facial identity and performance are disentangled in the ML model 210.

Experience has shown that inputting the output of the first level $212_1$ into the dense layers 222 and/or the dense layers 232 produces better results than inputting the output of the zeroth level $212_0$, which tends to not preserve the pose and expression of the input image. Although an output of the first level $212_1$ is shown as being input into the dense layers 222 and/or the dense layers 232, in some embodiments the output of the first level $212_1$ may be downsampled prior to being input into the dense layer 222 and/or the dense layer 232. In other embodiments, the output of a different level 212 (or a downsampling thereof) than the first level $212_1$ may be input into the dense layers 222 and/or the dense layers 232.

Illustratively, the decoder 154 outputs the image 240 in which a facial identity is changed relative to the input image 200. However, the performance in the input image 200, including a facial expression and pose, may remain unchanged in the output image 240.

Figure 3:
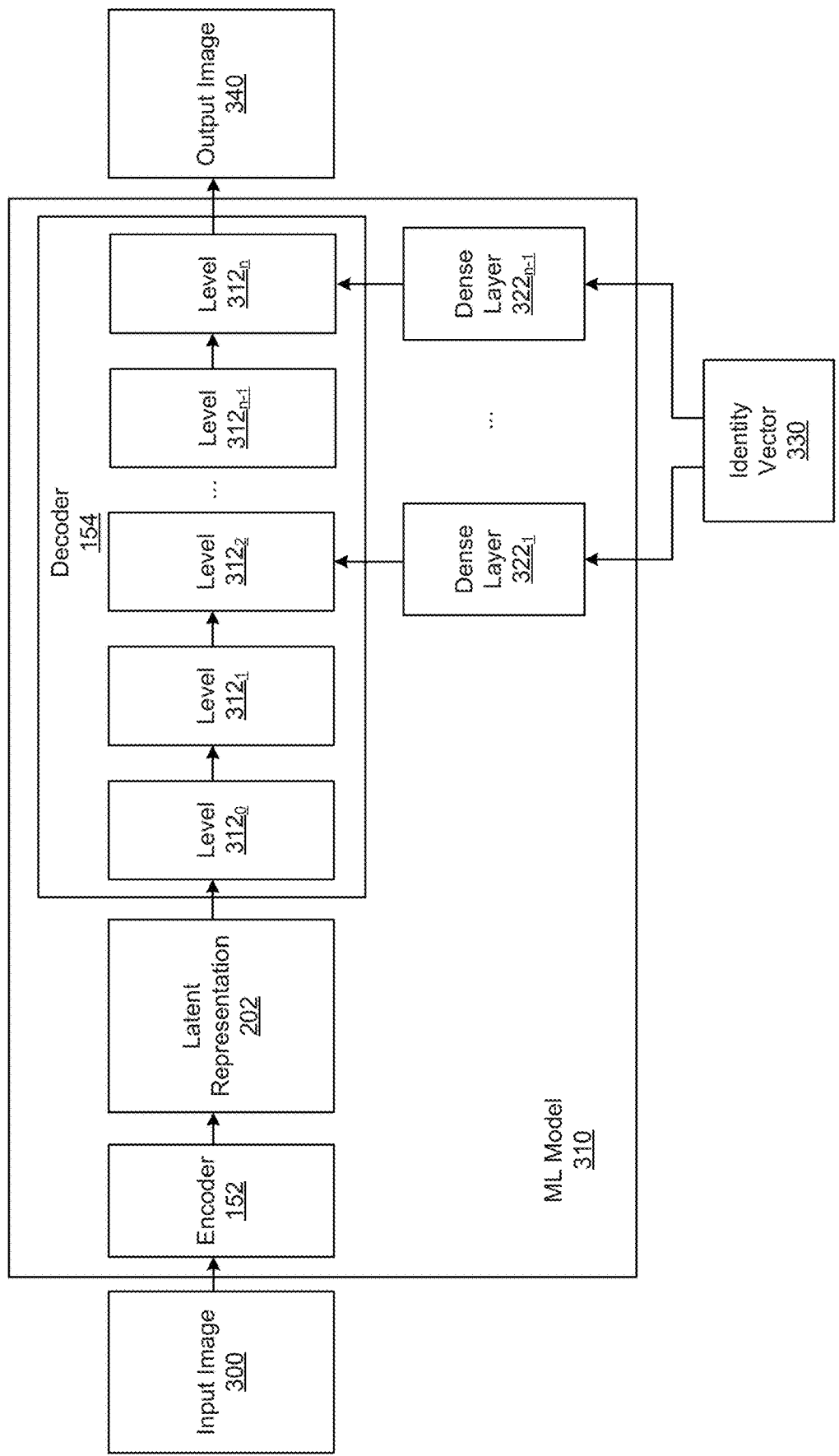
FIG. 3 is a more detailed illustration of the ML model of FIG. 1, according to other various embodiments.

FIG. 3 is a more detailed illustration of the ML model 150 of FIG. 1, according to other various embodiments. As shown, a machine learning model 310, which corresponds to the ML model 150, includes the encoder 152, the decoder 154, and a set dense layers $322_1$ to $322_{n-1}$. The dense layers 322 are referred to individually as a dense layer 322 and collectively as dense layers 322. Similar to the ML model 210 described above in conjunction with FIG. 2, the ML model 310 takes as input an image 300 that includes a face and can be normalized in some embodiments. Although a single image 300 is shown for illustrative purposes, multiple images, such as the frames of a video, can also be processed (sequentially) using the ML model 310.

In contrast to the ML model 210 described above in conjunction with FIG. 2, the ML model 310 includes only one set of dense layers 322, rather than including multiple sets of dense layers for different facial identities. In yet other embodiments, a single dense layer may be used in lieu of the set of dense layers 322 or each of the dense layers 222 and 232 described above in conjunction with FIG. 2.

As shown in FIG. 3, each of the dense layers 322 takes as input an identity vector 330. Similar to the dense layers 222 and 232 described above in conjunction with Figure, the dense layers 322 can be used to change the facial identities in images while the encoder-decoder track of the ML model 310 handles facial performances in the images, thereby disentangling facial identity and performance in the ML model 310. In particular, the facial identities can be changed to any facial identity used to train the ML model 310, as well as combinations thereof.

In some embodiments, the dense layers 322 are trained to output AdaIN coefficients. Similar to the AdaIN coefficients described above in conjunction with FIG. 2, the AdaIN coefficients output by the dense layers 322 can be used to control the operation of convolution layers within multiple levels $312_{2-n}$ of the decoder 154 so that the decoder 154 generates output images (e.g., output image 340) that include different facial identities, depending on the identity vector 330 that is input into the dense layers 322 and the AdaIN coefficients that are output by the dense layers 322. The levels 312 are referred to herein individually as a level 312 and collectively as levels 312. The identity vector 330 can specify a single facial identity or a combination of facial identities, such as a convex combination of facial identities. Similar to the description above in conjunction with FIG. 2, a combination of facial identities in the identity vector 330 can be used to generate an output image that includes the combination of facial identities, without requiring a combination of output images that include different facial identities.

In other embodiments, the dense layers 322 are trained to output values of weights of the convolution layers within the levels 312, as opposed to AdaIN coefficients. Such weight values that are output by the dense layers 322 also change the convolution operations performed by the decoder 154 so that the output image 340 can have different facial identities (while maintaining a performance), depending on the identity vector 330 that is input into the dense layers 322 and the weight values that are output by the dense layers 322. In some embodiments, modifying the weight values includes performing the following operations: feeding an ID vector through a dense layer to obtain the number of channels for a specific convolution (shape=(1, 1, num_channels)); applying a transposed convolution to obtain a tensor of shape=(3, 3, num_channels) for scale and offset parameters; and, given the scale and offset parameters, applying the AdaIN operation on common weights of the convolution.

Figure 4:
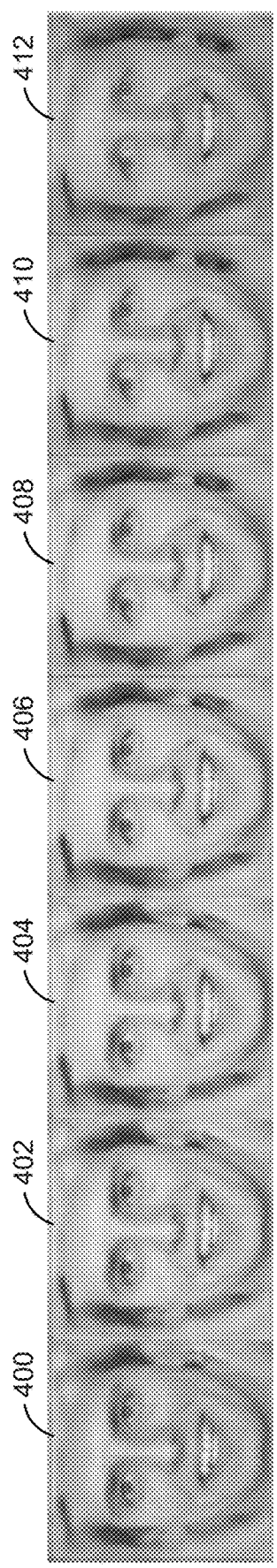
FIG. 4 illustrates an exemplar interpolation between facial identities generated using the ML model of FIG. 2, according to various embodiments.

FIG. 4 illustrates an exemplar interpolation between facial identities generated using the ML model 210 of FIG. 2, according to various embodiments. As described, interpolation between facial identities is enabled by the fact that only one decoder 154 is used to generate output images, as opposed to multiple decoders for different facial identities. Although an interpolation using the ML model 210 of FIG. 2 is shown for illustrative purposes, experience has shown that interpolations generated using the ML model 310 of FIG. 3 are similar in appearance. Further, although an interpolation between human facial identities is shown for illustrative purposes, embodiments may also be used to interpolate between human and CG facial identities, or between only CG facial identities. For example, an image or video frame that includes a CG facial identity could be input into the ML model 210, and sets of dense layers associated with the CG facial identity and a human facial identity can be used to generate an output image that includes an interpolation between the CG facial identity and the human facial identity.

As shown, interpolated facial identities in images 402, 404, 406, 408, and 410 combine the facial identities appearing in images 400 and 412 to various degrees. For example, the interpolated facial identity in the image 406 combines in equal amounts the facial identities from the images 400 and 412. By contrast, the interpolated facial identity in the image 402 includes more of the facial identity from the image 400, while the interpolated facial identity in the image 410 includes more of the facial identity from the image 412. Although the facial identities in the images 400, 402, 404, 406, 408, 410, and 412 are different, the performance in the images 400 and 412, including the smiling facial expression and facial pose, has been preserved by the ML model 210 when generating the images 402, 404, 406, 408, and 410 that include interpolated facial identities.

To generate the images 402, 404, 406, 408, and 410 that include interpolated facial identities, the face changing application 146 can compute weighted averages of AdaIN coefficients output by different sets of dense layers associated with the facial identities in the images 400 and 412, as described above in conjunction with FIG. 2. For example, the image 406 in which the facial identities in the images 400 and 412 are combined in equal amounts could be generated by taking a simple average of the AdaIN coefficients output by the sets of dense layers corresponding to the facial identities in the images 400 and 412, and using the averaged AdaIN coefficients to control convolution layers within the levels 212 of the decoder 154. The particular sets of dense layers, and the weighted averages to use in averaging outputs of the sets of dense layers, may be selected by a user to achieve a desired interpolation between facial identities.

In other embodiments in which the ML model 310 is used, facial identities can be interpolated by inputting an identity vector into the dense layers 322 that specifies a desired combination of facial identities. For example, the identity vector could be a "one-hot" vector that includes a 1 for a selected facial identity and 0s for other facial identities learned during training, or the identity vector could be a vector that specifies a combination of such facial identities.

Figure 5:
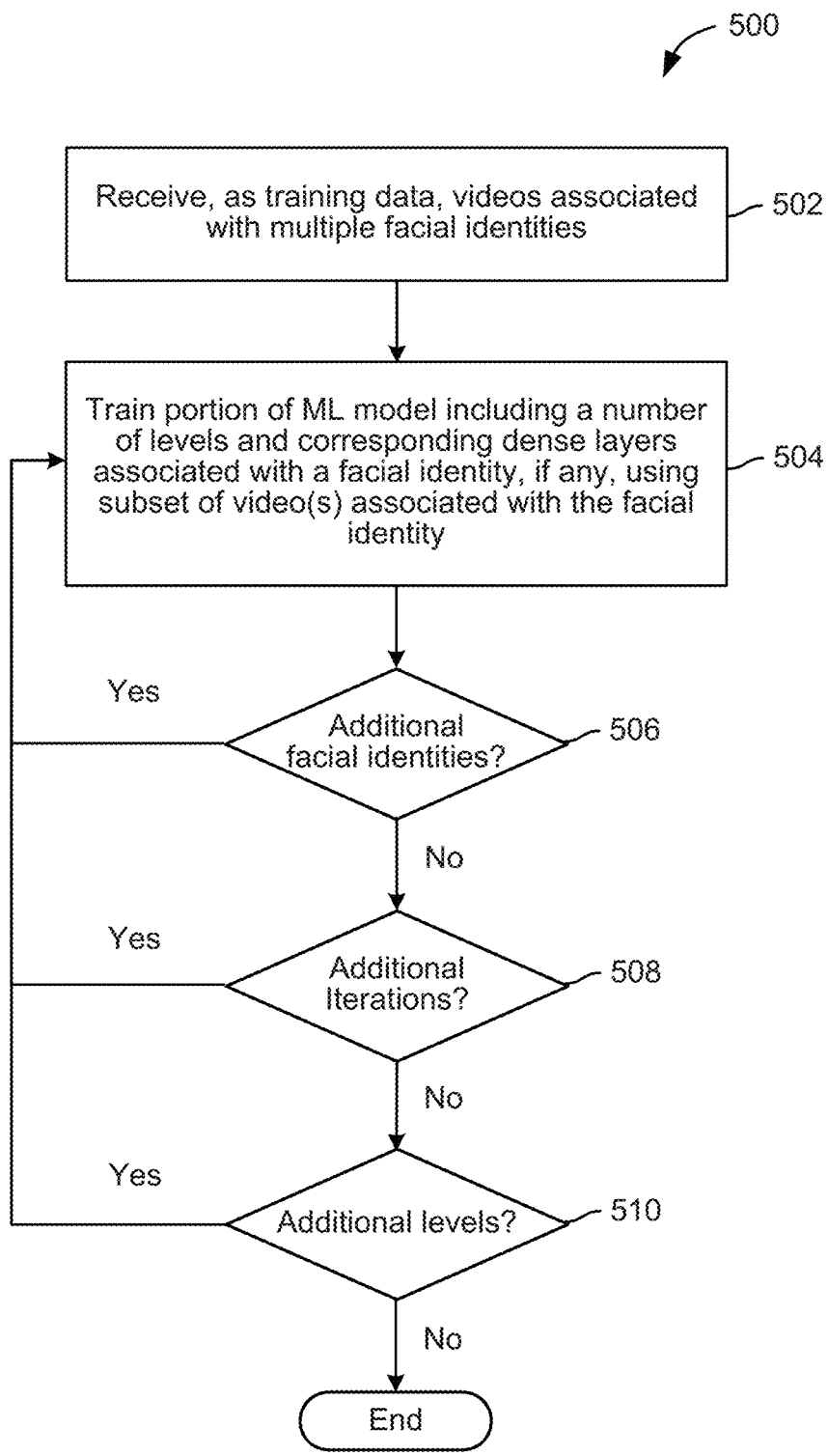
FIG. 5 sets forth a flow diagram of method steps for training the ML model of FIG. 2, according to various embodiments.

FIG. 5 sets forth a flow diagram of method steps for training the machine learning model 210 of FIG. 2, according to various embodiments. Although the method steps are described in conjunction with the systems of FIGS. 1-2, persons of ordinary skill in the art will understand that any system configured to perform the method steps, in any order, is within the scope of the present disclosure.

As shown, a method 500 begins at step 502, where the model trainer 116 receives, as training data, videos associated with multiple facial identities. In some embodiments, the videos are captured under similar environmental and lighting conditions, and/or frames of the videos are normalized to fit landmarks on faces therein to landmarks of a generic face with a neutral expression and to crop the frames to a predefined size. Although described with respect to videos that include multiple frames, in other embodiments, the training data may instead include standalone images. It should be noted that, when videos are used rather than standalone images, the characteristics of the resulting data tend to be more internally consistent. In addition, the quality and temporal stability of models trained on standalone images may be degraded.

At step 504, the model trainer 116 trains a portion of the ML model 210, including a number of the levels 212 of the decoder, and corresponding dense layers 222 or 232 (or other dense layers if the ML model 210 includes more than two sets of dense layers) associated with one of the facial identities 220 or 230, if any, using a subset of the received videos associated with the facial identity. In some embodiments, progressive training is performed in multiple iterations for each level 312 of the decoder and of the encoder 152. In such cases, the progressive training can include multiple "levels," during each of which a new level 212 of the decoder 154 and a new level of the encoder 152 is added. The "shock" of adding new, untrained network components, can be attenuated by a gain parameter that acts as a fader switch to gradually blend activations of the new network components with those of the trained, smaller network. During each iteration of progressive training, the model trainer 116 can shuffle the facial identities, select a batch of images for each facial identity, perform a gradient update, and then proceed to the next facial identity. Further, the progressive training can minimize a reconstruction loss for frames of the videos associated with different facial identities.

At step 506, the model trainer 116 determines whether there are additional facial identities. As described, each set of dense layers included in the ML model 210 (e.g., the dense layers 222 or 232) is associated with a different facial identity, and during each iteration of progressive training a subset of the video(s) associated with each facial identity are used to train corresponding dense layers of the portion of the ML model 210, if any.

If the model trainer 116 determines that there are additional facial identities, then the method 500 returns to step 504, where the model trainer 116 continues training the ML model 210 and a set of dense layers associated with another facial identity using a subset of the received videos associated with the other facial identity. That is, the model trainer 116 swaps in another set of dense layers associated with the other facial identity and trains the ML model 210 using a subset of the video(s) that are associated with the facial identity.

On the other hand, if the model trainer 116 determines that there are no additional facial identities, then the method 500 continues to step 508, where the model trainer 116 determines if additional training iterations are to be performed for the portion of the ML model 210. For example, the model trainer 116 could train the portion of the ML model 210 for a given number of iterations.

If the model trainer 116 determines that additional training iterations are to be performed, then the method 500 returns to step 504, where the model trainer 116 trains the portion of the ML model 210 and corresponding dense layers 222 or 232 (or other dense layers if the ML model 210 includes more than two sets of dense layers) associated with a facial identity using another subset of the received videos associated with the facial identity.

On the other hand, if the model trainer 116 determines that no additional training iterations are to be performed, then at step 510, the model trainer 116 determines if additional levels of the ML model 210 need to be trained. If no additional levels of the ML model 210 need to be trained, then the method 500 ends.

On the other hand, if additional levels of the ML model 210 need to be trained, then the method 500 returns to step 504, where the model trainer 116 trains another portion of the ML model 210 that includes an additional level 212 of the decoder 154 (and an additional level of the encoder 152) and corresponding dense layers 222 or 232 (or other dense layers, if the decoder 154 includes more than two sets of dense layers) associated with a facial identity, if any, using a subset of video(s) associated with the facial identity.

Figure 6:
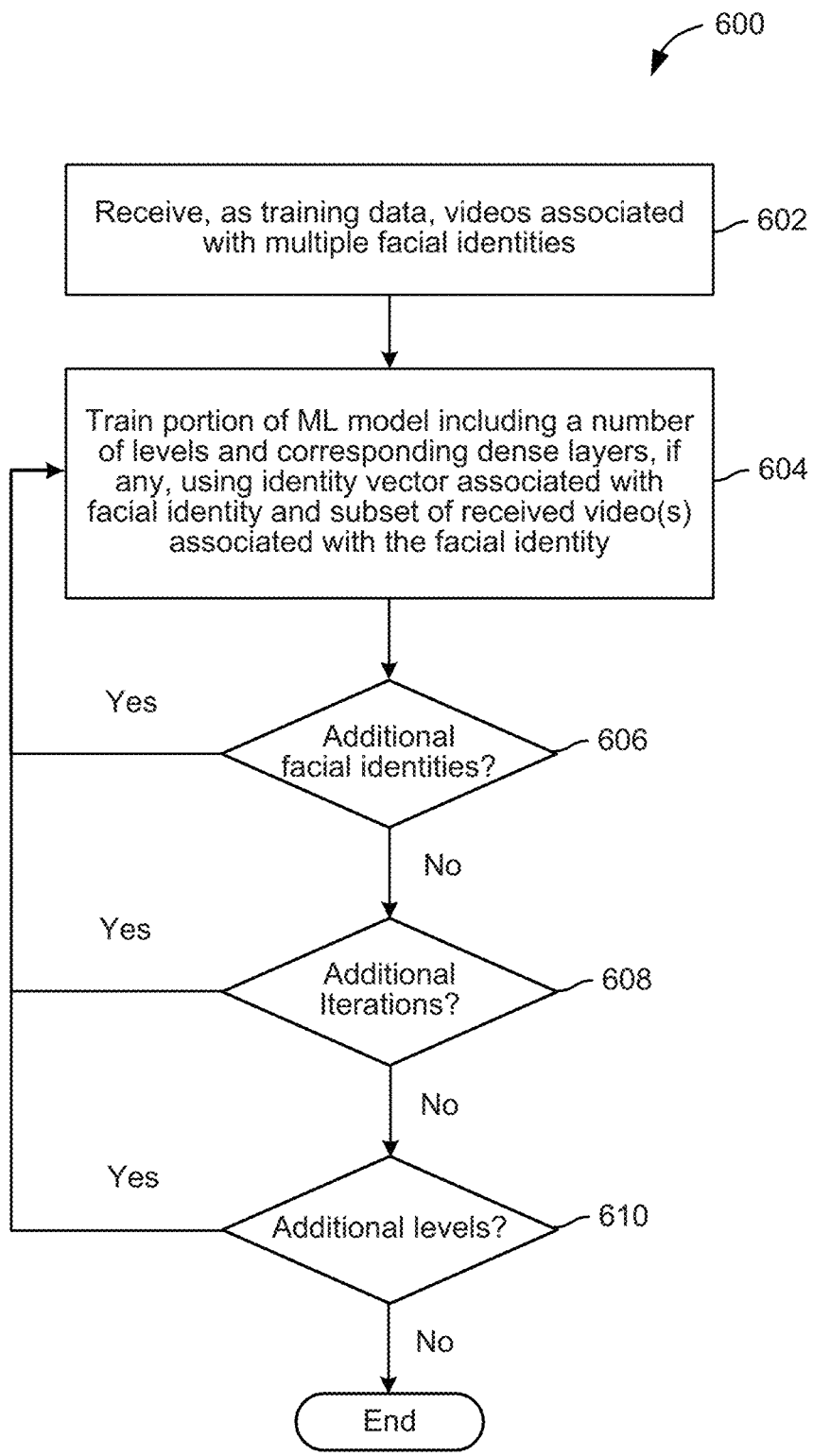
FIG. 6 sets forth a flow diagram of method steps for training the ML model of FIG. 3, according to various embodiments.

FIG. 6 sets forth a flow diagram of method steps for training the machine learning model 310 of FIG. 3, according to various embodiments. Although the method steps are described in conjunction with the systems of FIGS. 1 and 3, persons of ordinary skill in the art will understand that any system configured to perform the method steps, in any order, is within the scope of the present disclosure.

As shown, a method 600 begins at step 602, where the model trainer 116 receives, as training data, videos associated with multiple facial identities. Similar to step 502 described above in conjunction with FIG. 5, in some embodiments, the videos are captured under similar environmental and lighting conditions, and/or frames of the videos are normalized so as to fit landmarks on faces therein to landmarks of a generic face with a neutral expression. In other embodiments, standalone images may be received, rather than videos that include multiple frames, and used to train the ML model 310. However, as described above in conjunction with FIG. 5, training with videos may produce superior results.

At step 604, the model trainer 116 trains a portion of the ML model 310, including a number of the levels 312 of the decoder 154, and corresponding dense layers 322, if any, using an identity vector associated with a facial identity and a subset of the received videos associated with the facial identity. Similar to step 504 of the method 500 described above in conjunction with FIG. 5, in some embodiments, progressive training is performed for each level 312 of the decoder and of the encoder 152 in multiple iterations. During each such iteration, the model trainer 116 shuffles the facial identities, selects a batch of images for each facial identity, performs a gradient update, and proceeds to the next facial identity. Further, the progressive training can minimize a reconstruction loss for frames of the videos associated with different facial identities.

At step 606, the model trainer 116 determines whether there are additional facial identities. Similar to the method 500 described above in conjunction with FIG. 5, subsets of video(s) associated with different facial identities are used in conjunction with identity vectors associated with the corresponding facial identities during a number of iterations to train the portion of the ML model 310.

If the model trainer 116 determines that there are additional facial identities, then the method 600 returns to step 604, where the model trainer 116 continues training the portion of the ML model 310 using an identity vector associated with another facial identity and a subset of the received videos associated with the other facial identity.

On the other hand, if the model trainer 116 determines that there are no additional facial identities, then at step 608, the model trainer 116 determines if additional training iterations are to be performed for the portion of the ML model 310. For example, the model trainer 116 could train the portion of the ML model 310 for a given number of iterations.

If the model trainer 116 determines that additional training iterations are to be performed, then the method 600 returns to step 604, where the model trainer 116 trains the portion of the ML model 310 using an identity vector associated with another facial identity and another subset of the received videos associated with the other facial identity.

On the other hand, if the model trainer 116 determines that no additional training iterations are to be performed, then at step 610, the model trainer 116 determines if additional levels of the ML model 310 need to be trained. If no additional levels of the ML model 310 need to be trained, then the method 600 ends.

On the other hand, if additional levels of the ML model 310 need to be trained, then the method 600 returns to step 604, where the model trainer 116 trains a portion of the ML model 310 that includes an additional level 312 of the decoder 154 (and an additional level of the encoder 152) and corresponding dense layers 322, if any, using an identity vector associated with a facial identity and a subset of the received videos associated with the facial identity.

Figure 7:
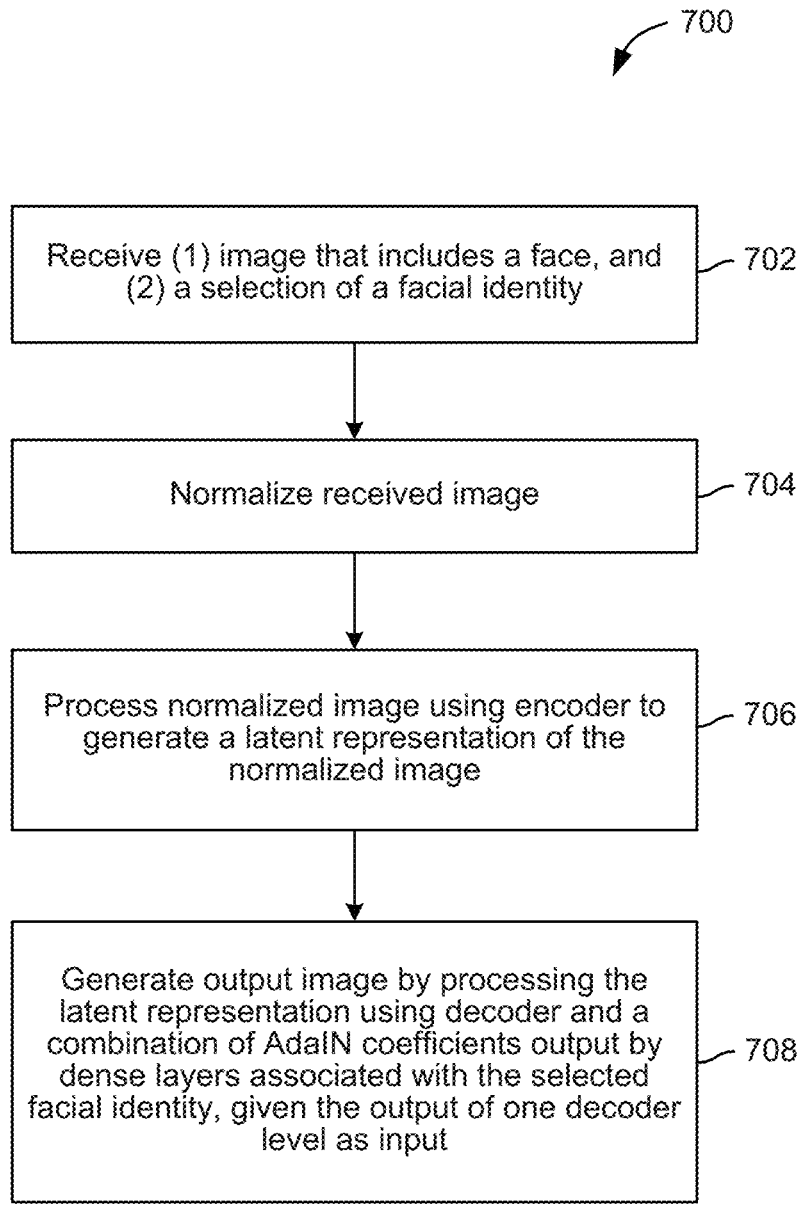
FIG. 7 sets forth a flow diagram of method steps for changing a face appearing in an image, according to various embodiments.

FIG. 7 sets forth a flow diagram of method steps for changing a face appearing in an image, according to various embodiments. Although the method steps are described in conjunction with the systems of FIGS. 1-2, persons of ordinary skill in the art will understand that any system configured to perform the method steps, in any order, is within the scope of the present disclosure.

As shown, a method 700 begins at step 702, where the face changing application 146 receives (1) an image that includes a face, and (2) a selection of a facial identity. For example, the selected facial identity could be one of the facial identities (e.g., the facial identity 220 or the facial identity 230) that the ML model 210 was trained for. Alternatively, the selected facial identity could be an interpolation that combines the facial identities that the ML model 210 was trained for. Although described with respect to a single image, the face changing application 146 can also receive a video including multiple frames that include faces and process each frame according to steps of the method 700.

At step 704, the face changing application 146 normalizes the received image. As described, any technically-feasible technique may be used to normalize the received image, such as using well-known face alignment techniques to compute an affine transformation for rotating, scaling, translating, etc. the image, and/or cropping the image to a predefined size.

At step 706, the face changing application 146 processes the normalized image using the encoder 152 in the ML model 210 to generate a latent representation of the normalized image. As described, the latent representation is a most compressed version of the normalized image in which favorable information has been preserved, and the encoder 152 learns to generate such a latent representation via training, which in the case of the ML model 210 is described above in conjunction with FIG. 5.

At step 708, the face changing application 146 generates an output image by processing the latent representation using the decoder 154 and a combination of AdaIN coefficients output by dense layers of the ML model 210 (e.g., dense layers 222 and/or 232) associated with the selected facial identity, given the output of one level of the decoder 154 as input. The combination may include AdaIN coefficients output by only one set of dense layers if the selected facial identity is associated with a single facial identity that the ML model 210 was trained for, in which case other set(s) of dense layers associated with different facial identities are not used. Alternatively, the combination may include weighted averages of AdaIN coefficients output by sets of dense layers associated with different facial identities that are being combined in the selected facial identity. As described, such AdaIN coefficients that are output by a set of dense layers, or that are weighted averages of AdaIN coefficients output by different sets of dense layers, can be used to control convolution layers within the decoder 154 so as to generate an output image that includes a face having the selected facial identity.

As described above in conjunction with FIG. 2, the latent representation of the normalized generated at step 706 can be first processed by the convolution and upscaling layers within the zeroth $212_0$ and first $212_1$ levels and of the decoder 154. An output of the first level $212_1$ (or another level) can then be input into the dense layers 222, the dense layers 232, and/or other dense layers associated with other facial identities, to determine AdaIN coefficients that are used to control the convolution layers within the remaining levels $212_2$ to $212_n$ of the decoder 154. In some embodiments, the output of the first level $212_1$ may be downsampled prior to being input into the dense layers 222, 232, and/or other dense layers. In other embodiments, the output of a level 212 other than the first level $212_1$ may be input into the dense layers 222, 232, and/or other dense layers.

Figure 8:
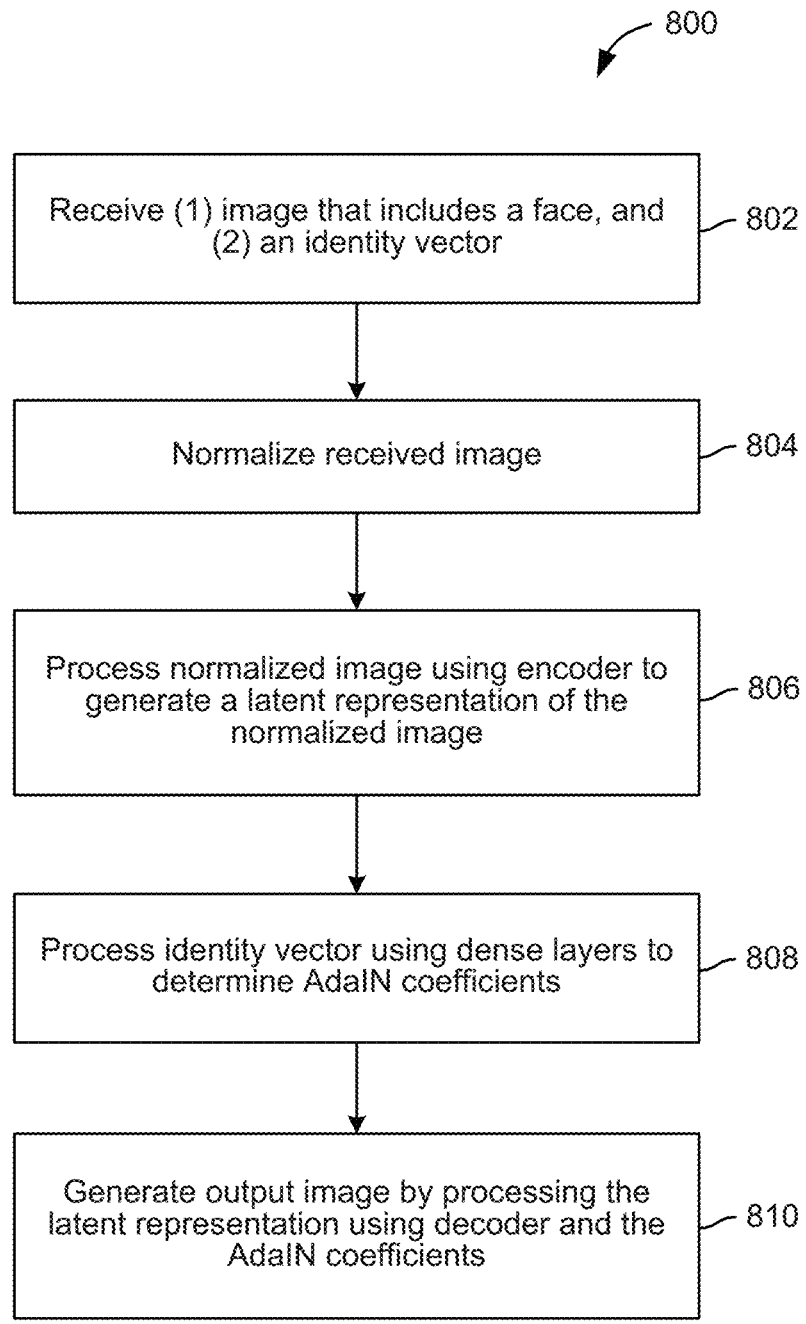
FIG. 8 sets forth a flow diagram of method steps for changing a face appearing in an image, according to other various embodiments.

FIG. 8 sets forth a flow diagram of method steps for changing a face appearing in an image, according to other various embodiments. Although the method steps are described in conjunction with the systems of FIGS. 1 and 3, persons of ordinary skill in the art will understand that any system configured to perform the method steps, in any order, is within the scope of the present disclosure.

As shown, a method 800 begins at step 802, where the face changing application 146 receives (1) an image that includes a face, and (2) an identity vector. As described, the identity vector can be a one-hot vector that includes a 1 for a selected facial identity and 0s for other facial identities learned during training. Alternatively, the identity vector can be a vector that specifies a combination of such facial identities. Although described with respect to a single image, the face changing application 146 can also receive a video including multiple frames and process each such frame (sequentially) according to steps of the method 800.

At step 804, the face changing application 146 normalizes the received image. As described, any technically-feasible technique may be used to normalize the received image, including well-known face alignment techniques.

At step 806, the face changing application 146 processes the normalized image using the encoder 152 of the ML model 310 to generate a latent representation of the normalized image. Step 806 is similar to step 706 of the method 700 described above in conjunction with FIG. 7.

At step 808, the face changing application 146 processes an identity vector using the dense layers 322 of the ML model 310 to determine AdaIN coefficients. As described, in some embodiments, the dense layers 322 can be trained to generate AdaIN coefficients for controlling convolution layers within the decoder 154 given an identity vector.

At step 810, the face changing application 146 generates an output image by processing the latent representation using the decoder 154 and the AdaIN coefficients determined at step 808. As described, the AdaIN coefficients are used to control convolution layers within the decoder 154 so as to generate an output image that includes a face having the facial identity specified by the identity vector that is received at step 802.

Figure 9:
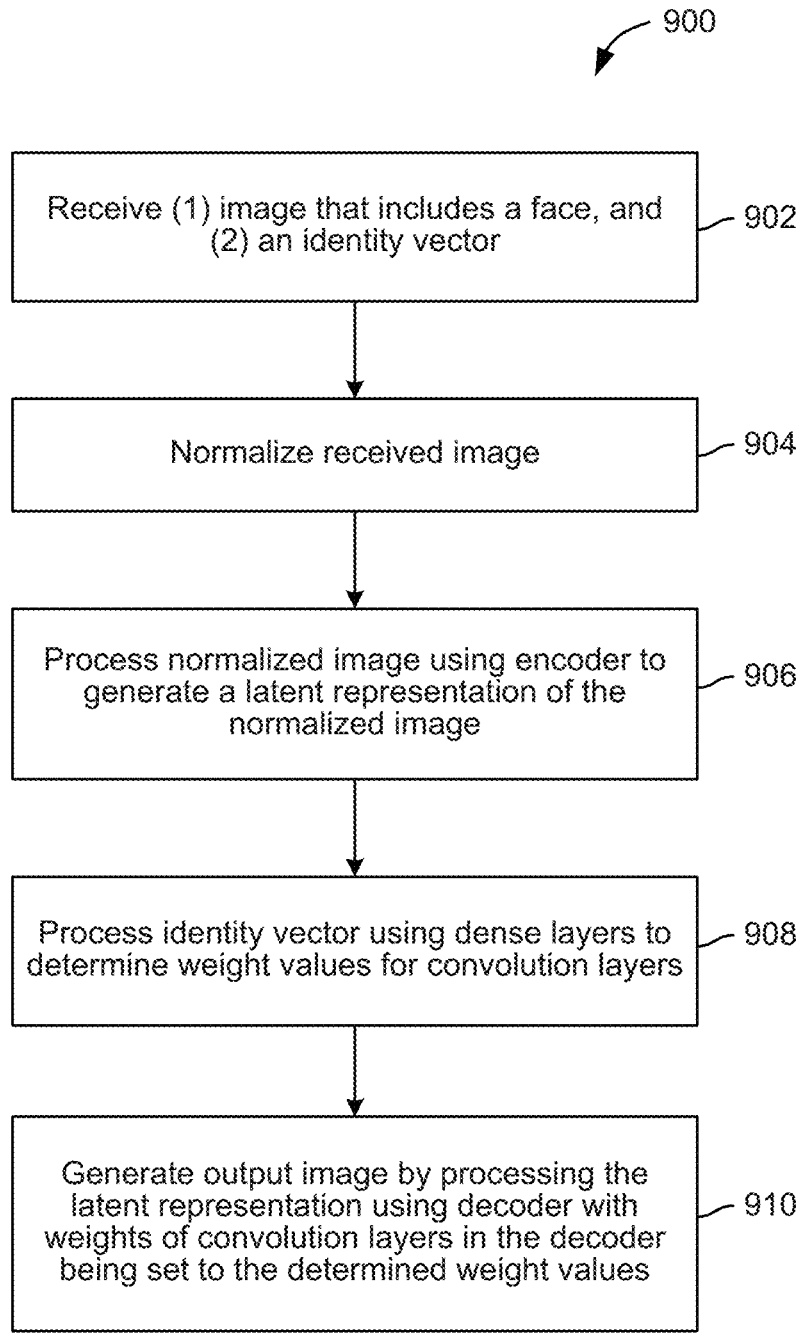
FIG. 9 sets forth a flow diagram of method steps for changing a face appearing in an image, according to other various embodiments.

FIG. 9 sets forth a flow diagram of method steps for changing a face appearing in an image, according to other various embodiments. Although the method steps are described in conjunction with the systems of FIGS. 1 and 3, persons of ordinary skill in the art will understand that any system configured to perform the method steps, in any order, is within the scope of the present disclosure.

As shown, a method 900 begins at step 902, where the face changing application 146 receives (1) an image that includes a face, and (2) an identity vector. Similar to step 802 described above in conjunction with FIG. 8, the identity vector may be a one-hot vector specifying a single facial identity that was learned during training, or a vector that specifies a combination of multiple such facial identities. Although described with respect to a single image, the face changing application 146 can also receive a video including multiple frames and process each such frame (sequentially) according to steps of the method 900.

At step 904, the face changing application 146 normalizes the received image. As described, any technically-feasible technique may be used to normalize the received image, including applying well-known face alignment techniques and/or cropping the image to predefined size.

At step 906, the face changing application 146 processes the normalized image using the encoder 152 of the ML model 310 to generate a latent representation of the normalized image. Step 906 is similar to step 706 of the method 700 described above in conjunction with FIG. 7.

At step 908, the face changing application 146 processes the identity vector using the dense layers 322 of the ML model 310 to determine weight values for convolution layers of the decoder 154. As described, in some embodiments, the dense layers 322 can be trained to output weight values for convolution layers in the decoder 154 given an input identity vector.

At step 910, the face changing application 146 generates an output image by processing the latent representation using the decoder 154 of the ML model 310, with weights of the convolution layers in the decoder 154 being set based on the weight values determined at step 908. The decoder 154 that includes convolution layers having weights set based on the determined weight values can then be used to generate an output image that includes a face having the facial identity specified by the identity vector that is received at step 902.

Although discussed herein primarily with respect to human and CG faces, some embodiments may also be used to change the identities of other types of faces, such as animal faces, or even objects other than faces, that appear in standalone images or the frames of a video. Generally, embodiments may be used for domain transfers in image space, with faces being an example domain.

In sum, techniques are disclosed for changing the identities of faces in images. In some embodiments, a tunable model for changing facial identities in images includes an encoder, a decoder, and dense layers that generate either AdaIN coefficients that control the operation of convolution layers in the decoder or the values of weights within such convolution layers, allowing the model to change the identity of a face in an image based on a user selection. A separate set of dense layers may be trained to generate AdaIN coefficients for each of a number of facial identities, and the AdaIN coefficients output by different sets of dense layers can be combined to interpolate between facial identities. Alternatively, a single set of dense layers may be trained to take as input an identity vector and output AdaIN coefficients or values of weighs within convolution layers of the decoder.

At least one technical advantage of the disclosed techniques relative to the prior art is that the disclosed techniques can be effectively utilized to change or modify facial identities in high-resolution (e.g., megapixel) images or frames of a video. The disclosed techniques also enable multiple facial identities to be interpolated to produce novel combinations of facial identities, without requiring separate training of a machine learning model for each desired combination of facial identities. Further, using the disclosed techniques, models can be learned without requiring labeled data, which permits the disclosed techniques to be applied to a broader class of images and videos relative to prior art techniques. These technical advantages represent one or more technological improvements over prior art approaches.

1. In some embodiments, a computer-implemented method for changing a face within an image or video frame comprises encoding an input image that includes a face to generate a latent representation of the input image, and decoding the latent representation based on one or more parameters that are determined via at least one dense layer of a machine learning model to generate an output image.

2. The computer-implemented method of clause 1, wherein the one or more parameters include one or more adaptive instance normalization (AdaIN) coefficients.

3. The computer-implemented method of clauses 1 or 2, wherein the one or more parameters include values for weights in a plurality of convolution layers of the machine learning model.

4. The computer-implemented method of any of clauses 1-3, wherein the latent representation is decoded using a decoder that includes a plurality of levels, wherein each level included in the plurality of levels comprises a convolution layer and an upscaling layer, and the one or more parameters are determined by processing, for each level included in the plurality of levels, an output generated by the convolution layer included in the level using a corresponding dense layer included in the at least one dense layer.

5. The computer-implemented method of any of clauses 1-4, wherein decoding the latent representation based on the one or more parameters comprises processing, via a zeroth level included in the plurality of levels, the latent representation, processing, via a first level included in the plurality of levels, an output of the zeroth level, and processing, via the at least one dense layer, an output of the first level or a downsampling of the output of the first level to determine the one or more parameters.

6. The computer-implemented method of any of clauses 1-5, wherein the at least one dense layer includes a plurality of sets of dense layers associated with respective facial identifies.

7. The computer-implemented method of any of clauses 1-6, further comprising determining the one or more parameters using one set of dense layers included in the plurality of sets of dense layers.

8. The computer-implemented method of any of clauses 1-7, further comprising determining the one or more parameters as weighted averages of outputs generated by the plurality of sets of dense layers.

9. The computer-implemented method of any of clauses 1-8, wherein each dense layer included in the at least one dense layer receives an input vector specifying a facial identity and outputs at least one of the one or more parameters.

10. The computer-implemented method of any of clauses 1-9, wherein encoding the input image comprises processing the input image using an encoder of an autoencoder, and decoding the latent representation comprises processing the latent representation using a decoder of the autoencoder.

11. The computer-implemented method of any of clauses 1-10, wherein the input image is a standalone image or a frame of a video.

12. In some embodiments, a non-transitory computer-readable storage medium includes instructions that, when executed by a processing unit, cause the processing unit to perform steps for changing a face within an image or video frame, the steps comprising encoding an input image that includes a face to generate a latent representation of the input image, and decoding the latent representation based on one or more parameters that are determined via at least one dense layer of a machine learning model to generate an output image.

13. The computer-readable storage medium of clause 12, the steps further comprising performing one or more training operations to train an encoder to encode the input image, a decoder to decode the latent representation, and the at least one dense layer to generate the one or more parameters, wherein the one or more training operations include minimizing a reconstruction loss using frames of videos that include a plurality of facial identities.

14. The computer-readable storage medium of clauses 12 or 13, wherein the one or more training operations comprise one or more training operations to train a first set of levels included in the machine learning model, and one or more additional training operations to train a second set of levels included in the machine learning model, wherein the second set of levels includes more levels than the first set of levels.

15. The computer-readable storage medium of any of clauses 12-14, wherein the one or more training operations to train the first set of levels comprises a plurality of iterations during which the first set of levels is trained using a subset of the videos that include the plurality of facial identities.

16. The computer-readable storage medium of any of clauses 12-15, wherein the one or more parameters include one or more adaptive instance normalization (AdaIN) coefficients or values for weights in a plurality of convolution layers of the machine learning model.

17. The computer-readable storage medium of any of clauses 12-16, wherein the at least one dense layer includes a plurality of sets of dense layers associated with respective facial identifies.

18. The computer-readable storage medium of any of clauses 12-17, wherein each dense layer included in the at least one dense layer receives an input vector specifying a facial identity and outputs at least one of the one or more parameters.

19. The computer-readable storage medium of any of clauses 12-18, wherein the facial identity specified by the input vector is a combination of facial identities.

20. In some embodiments, a computing device comprises a memory storing an application, and a processor coupled to the memory, wherein when executed by the processor, the application causes the processor to encode an input image that includes a face to generate a latent representation of the input image, and decode the latent representation based on one or more parameters that are determined via at least one dense layer of a machine learning model to generate an output image.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for changing a face within an image or video frame, the method comprising:
    encoding an input image that includes a first face to generate a latent representation of the input image; and
    decoding the latent representation based on one or more parameters that are determined via at least one dense layer of a machine learning model to generate an output image that includes a second face, wherein the one or more parameters are used to change a first facial identity of the first face to a second facial identity of the second face.

2. The computer-implemented method of claim 1, wherein the one or more parameters include one or more adaptive instance normalization (AdaIN) coefficients.

3. The computer-implemented method of claim 1, wherein the one or more parameters include values for weights in a plurality of convolution layers of the machine learning model.

4. The computer-implemented method of claim 1, wherein the at least one dense layer includes a plurality of sets of dense layers associated with respective facial identifies.

5. The computer-implemented method of claim 4, further comprising determining the one or more parameters using one set of dense layers included in the plurality of sets of dense layers.

6. The computer-implemented method of claim 4, further comprising determining the one or more parameters as weighted averages of outputs generated by the plurality of sets of dense layers.

7. The computer-implemented method of claim 1, wherein each dense layer included in the at least one dense layer receives an input vector specifying a facial identity and outputs at least one of the one or more parameters.

8. The computer-implemented method of claim 1, wherein encoding the input image comprises processing the input image using an encoder of an autoencoder, and decoding the latent representation comprises processing the latent representation using a decoder of the autoencoder.

9. The computer-implemented method of claim 1, wherein the input image is a standalone image or a frame of a video.

10. A computer-implemented method for changing a face within an image or video frame, the method comprising:
    encoding an input image that includes a face to generate a latent representation of the input image; and
    decoding the latent representation based on one or more parameters that are determined via at least one dense layer of a machine learning model to generate an output image,
    wherein the latent representation is decoded using a decoder that includes a plurality of levels, and each level included in the plurality of levels comprises a convolution layer and an upscaling layer, and
    wherein the one or more parameters are determined by processing, for each level included in the plurality of levels, an output generated by the convolution layer included in the level using a corresponding dense layer included in the at least one dense layer.

11. The computer-implemented method of claim 10, wherein decoding the latent representation based on the one or more parameters comprises:
    processing, via a zeroth level included in the plurality of levels, the latent representation;
    processing, via a first level included in the plurality of levels, an output of the zeroth level; and
    processing, via the at least one dense layer, an output of the first level or a downsampling of the output of the first level to determine the one or more parameters.

12. A non-transitory computer-readable storage medium including instructions that, when executed by a processing unit, cause the processing unit to perform steps for changing a face within an image or video frame, the steps comprising:
    encoding an input image that includes a first face to generate a latent representation of the input image; and
    decoding the latent representation based on one or more parameters that are determined via at least one dense layer of a machine learning model to generate an output image that includes a second face, wherein the one or more parameters are used to change a first facial identity of the first face to a second facial identity of the second face.

13. The computer-readable storage medium of claim 12, the steps further comprising performing one or more training operations to train an encoder to encode the input image, a decoder to decode the latent representation, and the at least one dense layer to generate the one or more parameters, wherein the one or more training operations include minimizing a reconstruction loss using frames of videos that include a plurality of facial identities.

14. The computer-readable storage medium of claim 13, wherein the one or more training operations comprise:
    one or more training operations to train a first set of levels included in the machine learning model; and
    one or more additional training operations to train a second set of levels included in the machine learning model, wherein the second set of levels includes more levels than the first set of levels.

15. The computer-readable storage medium of claim 14, wherein the one or more training operations to train the first set of levels comprises a plurality of iterations during which the first set of levels is trained using a subset of the videos that include the plurality of facial identities.

16. The computer-readable storage medium of claim 12, wherein the one or more parameters include one or more adaptive instance normalization (AdaIN) coefficients or values for weights in a plurality of convolution layers of the machine learning model.

17. The computer-readable storage medium of claim 12, wherein the at least one dense layer includes a plurality of sets of dense layers associated with respective facial identities.

18. The computer-readable storage medium of claim 12, wherein each dense layer included in the at least one dense layer receives an input vector specifying a facial identity and outputs at least one of the one or more parameters.

19. The computer-readable storage medium of claim 18, wherein the facial identity specified by the input vector is a combination of facial identities.

20. A computing device comprising:
    a memory storing an application; and
    a processor coupled to the memory, wherein when executed by the processor, the application causes the processor to:
        encode an input image that includes a first face to generate a latent representation of the input image, and
        decode the latent representation based on one or more parameters that are determined via at least one dense layer of a machine learning model to generate an output image that includes a second face, wherein the one or more parameters are used to change a first facial identity of the first face to a second facial identity of the second face.

* * * * *

UNITED STATES PATENT AND TRADEMARK OFFICE
CERTIFICATE OF CORRECTION

PATENT NO. : 11,568,524 B2
APPLICATION NO. : 16/850898
DATED : January 31, 2023
INVENTOR(S) : Leonard Markus Helminger et al.

It is certified that error appears in the above-identified patent and that said Letters Patent is hereby corrected as shown below:

On the Title Page

Page 2, Column 2, Line 18 (56) References Cited:
Please delete "Mirkin et al., "On Face Segmentation, Face Swapping, and Face Perception", 13th IEEE International Conference on Automatic Face & Gesture Recognition, DOI 10.1109/FG.2018.00024, 2018, pp. 98-105." and insert --Nirkin et al., "On Face Segmentation, Face Swapping, and Face Perception", 13th IEEE International Conference on Automatic Face & Gesture Recognition, DOI 10.1109/FG.2018.00024, 2018, pp. 98-105.--.

Signed and Sealed this
Fourteenth Day of March, 2023

Katherine Kelly Vidal
*Director of the United States Patent and Trademark Office*